United States Patent
Chen et al.

(10) Patent No.: US 8,725,707 B2
(45) Date of Patent: May 13, 2014

(54) DATA CONTINUOUS SQL PROCESS

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 12/411,670

(22) Filed: Mar. 26, 2009

(65) Prior Publication Data

US 2010/0250572 A1 Sep. 30, 2010

(51) Int. Cl.
*G06F 17/00* (2006.01)
*G06F 7/00* (2006.01)

(52) U.S. Cl.
USPC .......................................... 707/702; 707/703

(58) Field of Classification Search
CPC .................... G06F 17/30917; G06F 17/30932; H04L 65/40; H04L 29/00
USPC ......................................................... 707/702
See application file for complete search history.

(56) References Cited

U.S. PATENT DOCUMENTS

| | | | | |
|---|---|---|---|---|
| 5,794,250 | A * | 8/1998 | Carino et al. | 707/999.004 |
| 6,636,845 | B2 * | 10/2003 | Chau et al. | 707/999.001 |
| 6,678,641 | B2 * | 1/2004 | Gibbs et al. | 702/189 |
| 7,243,124 | B1 * | 7/2007 | Gardner et al. | 709/205 |
| 7,266,563 | B2 * | 9/2007 | Morris et al. | 707/702 |
| 7,339,609 | B2 * | 3/2008 | Gibbs et al. | 348/157 |
| 7,412,481 | B2 * | 8/2008 | Nicholls et al. | 709/204 |
| 7,437,397 | B1 * | 10/2008 | Koudas et al. | 708/422 |
| 7,464,068 | B2 * | 12/2008 | Fan et al. | 707/999.001 |
| 7,480,660 | B1 * | 1/2009 | Black | 707/999.001 |
| 7,548,937 | B2 * | 6/2009 | Gu et al. | 707/999.104 |
| 7,590,644 | B2 * | 9/2009 | Matsakis et al. | 707/999.101 |
| 7,860,884 | B2 * | 12/2010 | Lee et al. | 707/769 |
| 7,870,167 | B2 * | 1/2011 | Lu et al. | 707/803 |
| 7,984,040 | B2 * | 7/2011 | Mishra et al. | 707/713 |
| 8,396,886 | B1 * | 3/2013 | Tsimelzon et al. | 707/769 |
| 2003/0036887 | A1 * | 2/2003 | Gibbs et al. | 702/189 |
| 2006/0277230 | A1 * | 12/2006 | Nishizawa et al. | 707/204 |
| 2008/0046401 | A1 * | 2/2008 | Lee et al. | 707/2 |
| 2008/0120283 | A1 * | 5/2008 | Liu et al. | 707/4 |
| 2008/0133465 | A1 * | 6/2008 | Lee et al. | 707/2 |
| 2008/0162568 | A1 * | 7/2008 | Shen | 707/104.1 |
| 2009/0037370 | A1 * | 2/2009 | Mishra et al. | 707/2 |
| 2009/0106190 | A1 * | 4/2009 | Srinivasan et al. | 707/2 |
| 2009/0106218 | A1 * | 4/2009 | Srinivasan et al. | 707/4 |
| 2009/0125536 | A1 * | 5/2009 | Lu et al. | 707/101 |
| 2009/0228465 | A1 * | 9/2009 | Krishnamurthy et al. | 707/4 |

OTHER PUBLICATIONS

Arasu et al. "A Denotational Semantics for Continuous Queries over Streams and Relations", Sep. 2004, SIGMOD Record, vol. 33 No. 3, pp. 6-11.*

* cited by examiner

*Primary Examiner* — Pavan Mamillapalli

(57) ABSTRACT

One embodiment is a method that repeatedly triggers a User Defined Function (UDF) that generates a data stream. A data continuous Structured Query Language (SQL) query is applied to the data stream to construct a data continuous SQL process (DCSP) which executes in a database.

20 Claims, 5 Drawing Sheets

DATA CONTINUOUS SQL PROCESS

BACKGROUND

Databases are electronic filing systems that store records or data in a computer system. Computer programs or users can send and retrieve data from the database using a database management system (DBMS).

The amount of data stored in database systems has been continuously increasing over the last few decades. Database management systems manage large volumes of data that need to be efficiently accessed and manipulated. Queries to the database are becoming increasingly complex to execute in view of such massive data structures. If queries to the database are not completed in a sufficient amount of time, then acceptable performance is difficult to achieve.

Many applications are based on data being continuously collected and provided to databases. Such databases pose challenges to efficiently process and query data in a timely fashion.

DETAILED DESCRIPTION

Figure 1:
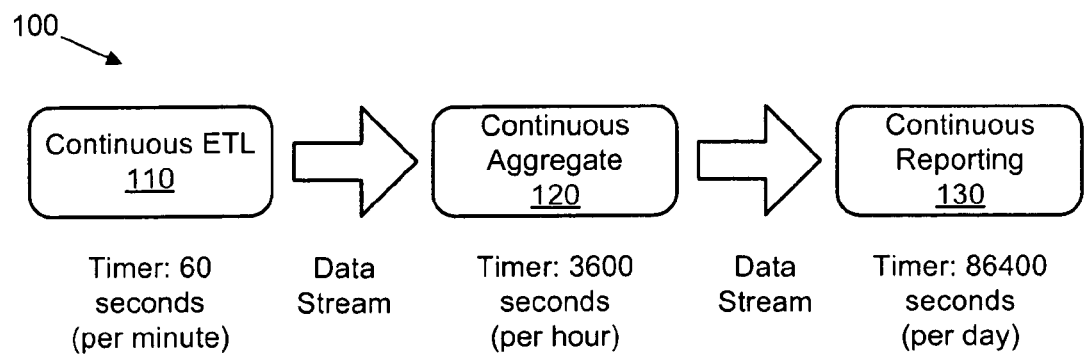
FIG. 1 shows a data-continuous process with three stream-driven functions that execute in different cycles in accordance with an exemplary embodiment.

Exemplary embodiments in accordance with the invention include apparatus, systems, and methods for automatic information derivation through continuous querying and processing of data streams. A Data-Continuous Structured Query Language (SQL) Process (DCSP) is an automated enterprise information process that processes continuous incoming data streams.

The basic operators of a DCSP are database User Defined Functions (UDFs). Exemplary embodiments in accordance with the invention introduce a new kind of UDFs called Relation Valued Functions (RVFs) with both input and return values specified as relations. An RVF represents a relational transformation that is composed with other relational operators. The RVFs are triggered repeatedly by stream inputs, timers, or event-conditions. The sequence of executions generates a data stream. To capture such data continuation semantics, exemplary embodiments a station for hosting a continuously-executed RVF and a pipe as a First-In-First-Out (FIFO) stream container for asynchronous communication between stations. A station is specified with triggering factors and the outgoing pipes. A pipe is strongly typed by a relation schema with a stream key for identifying its elements. As an abstract object, a pipe is implemented as a queue or stream table.

To allow a DCSP to be constructed from stations and pipes recursively, exemplary embodiments use Data Continuous Query (DCQ) that is a query applied to a stream data source—a stream table, a station (via pipe) or recursively a DCQ, with well defined data continuation semantics. A DCQ itself is treated as a station, meaning that stations are constructed from existing ones recursively in terms of SQL. Based on these notions, a DCSP is modeled as a graph of stations (nodes) and pipes (links) and represented by a set of correlated DCQs. Specifying DCSP in SQL allows exemplary embodiments to use SQL in expressing relational transformations on the stream elements and in pushing DCSP execution down to the database layer for performance and scalability. The implementation issues based on parallel database technology are further discussed herein.

In order to assist in a further discussion of exemplary embodiments in accordance with the invention (i.e., exemplary embodiments), the description is divided with headings at various sections.

Overview

Many enterprise applications are based on information or data that is continuously collected. This data is processed as automatic information derivation.

Automatic information derivation is a continuous querying and computation process where an operation is driven by data streams and outputs to another data stream. In this way, the process acts as both a stream consumer and a stream producer. Since input is continuous (i.e., does not end), the process does not cease; although it may have different paces at different operations. For example, if the incoming raw data are kept in a "regular value ranges", it is unnecessary to refresh the average measures frequently.

FIG. 1 shows a data-continuous process 100 with three stream-driven functions that execute in different cycles. The functions include extract, transform, and load (ETL) 110, aggregate 120, and reporting 130. They run in different cycles with the ETL function 110 executed most frequently and reporting function 130 the least frequently. These functions are not cascaded on the per-execution basis since for every 60 executions of the ETL function 110, the aggregate function 120 runs only once. Additionally, for every 24 executions of the aggregate function 120, the reporting function 130 runs only once. The execution and composing characteristics of these functions are therefore sharply different from that of the "work-nodes" and "route nodes" found in business processes.

The data-stream-driven processes are specified with SQL queries in which their executions are supported directly at the DBMS level. Pushing down continuous information derivation to the data management layer avoids the round-trip traffic in data access and takes advantage of parallel database technology for performance and scalability.

Database User Defined Functions (UDFs) provide a way to have computations invoked from SQL queries, and subsequently executed by the underlying database engine for enhanced performance and scalability. To build a data-continuous process around UDFs, their behaviors under streamed input and output is managed as a cross discipline of stream processing, pipelined data transformation, and continuous querying. Exemplary embodiments enable the composition of UDFs under streamed input/output.

A SQL query represents tree-structured relational transformations, but is unable to express general graph-structured operations with the data-flows forked or separated from control-flows. When UDFs are involved in the forked transformation paths, using separate queries to express these paths may lead to the duplicated UDF executions, which is inefficient, and could be inconsistent if the involved UDF have database side effects. Further, the regular query composition semantics do not cover the data-stream based asynchronous operations. To resolve this, exemplary embodiments establish a semantic base for specifying DCSPs and covering the data-continuation semantics.

Data-Continuous SQL Process (DCSP)

With exemplary embodiments, Data-Continuous SQL Process (DCSP) is used for automatic, continuous, multi-staged information derivations. DCSP is a new kind of process constructed from data-stream-driven, continuously running, asynchronously coupled UDFs, in terms of the SQL queries under the data-continuation semantics. The execution of a DCSP is pushed down to the database engine for performance and scalability.

To wrap application functions with relational signatures, we introduce a special kind of UDF with input as a list of relations and return value as a relation, called Relation Valued Functions (RVF). Besides the possible database update effects coded in the function body, an RVF maps the input relation(s) to the returned relation like a relational operator and thus can be composed with other relational operators in a SQL query.

When an RVF is triggered to run repeatedly by stream inputs, timers, or event-conditions, the sequence of executions generates a data stream that is filtered by SQL operators, deposited to a stream table (i.e. a table holding time varying stream elements), or fed in other RVFs. As shown in FIG. 1, however, along a data-flow path, the streamed RVFs are not composed on the one-execution basis; they are coupled asynchronously.

To capture such data continuation semantics, we introduce the notion of station for hosting a continuously executed RVF, and the notion of pipe as the FIFO stream container for connecting RVF stations. More specifically, a station is specified with the triggering conditions and the outgoing pipes, and serves as a continuously running actor as well as a stream data source in a DCSP. A pipe is defined with a relation schema for type-preservation and with a stream key for identifying stream elements. A pipe is an abstract object that is instantiated to a queue or a stream table (in memory or on disk). The relations returned from an RVF are replicated to multiple pipes for multiple destination RVF stations.

To allow a DSCP to be constructed from stations and pipes recursively, we introduce the notion of Data Continuous Query (DCQ) that is a query applied to a stream data source, such as a stream table, a station (via pipe), or recursively a DCQ. A DCQ itself is treated as a station. Under DCQ data-continuation semantics:

(1) connecting two stations through a pipe p, $F_1$ ((p) $F_2$(T)), means that $F_1$ takes (p) $F_2$(T) as its stream data source, which is different from the one-time execution based RVF function composition;

(2) applying a DCQ, Q on a stream data source means that Q provides the relational transformation for each one stream element (a relation) of that stream data source.

To overcome the limitations of a SQL statement in representing graph-based operations, we use multiple correlated DCQs to represent a DSCP, where the data flows are naturally expressed by DCQs, and the execution ordering are based on such a rule that a DCQ station is defined before being referred to in other DCQs.

In general, a DCSP is the composition of stream-driven operations at the process level with SQL interface. This composition represents an initial step to the convergence of the high-level declarative semantics of SQL and the procedural semantics found in business processes, in the data continuation context.

Relation Valued Function (RVF)

Currently UDFs are categorized into scalar UDFs, aggregate UDFs, and table UDFs. These UDFs are unable to express relational transformations since their inputs or outputs are not relations, and cannot be composed with other relational operators in a query. In order to unify the signatures of UDFs and relational-operators, we introduce the kind of UDFs with input as a list of relations and return value as a relation, called Relation Valued Functions (RVFs). For instance, a simple RVF definition is

```
CREATE RVF f (R₁, R₂) RETURN R₃ {
    SCHEMA R₁ (/*schema*/);
    SCHEMA R₂ (/*schema*/);
    SCHEMA R₃ (/*schema*/);
    PROCEDURE (/*procedure*/)
}
``` where the relation schemas $R_1$, $R_2$ and $R_3$ are the signature of f. The actual relation instances or query results compliant to those schemas are bound to f as actual parameters.

An RVF performs a relational transformation (although it can have database update effects in the function body) just like a relational operator and thus is easily composed with other relational operators in a SQL query, as shown by the following example.

SELECT alert FROM (allert_rvf(SELECT * FROM rivers WHERE water_level>50));

where allert_rvf is an RVF.

The return value of an RVF is chosen on application specific purpose regardless of other effects coded in the function body, including the database update effects.

For specifying a function with RVF signature, we provided the following two mechanisms to turn input parameters (i.e. argv[ ]) to a relation.

For converting a list of arguments to a tuple set, a "system" Table Valued Function (TVF, with input as a tuple and return as a tuple-set), a2r is provided that maps a CSV (comma-separated values) to a "argument tuple-set", args, as the input of a RVF. For instance, an RVF for eq-joining tuple-sets R, S on attributes R.A and S.B can be expressed as:

eq-join(a2r("R.A,S.B"),R,S).

For converting the input of a per-tuple processing UDF to a relation, we use CROSS APPLY introduced to T-SQL. CROSS APPLY a TVF to a table (or tuple-set) applies the TVF to each tuple of the table, unions the resulting tuple sets, and joins the input table. In the following example, TVF, f (river_seg_id), is applied to the selected set of river segments, resulting in a tuple-set SELECT * FROM river_segs WHERE river_name="Red_River" CROSS APPLY f(river_seg_id).

Therefore, CROSS APPLY a TVF to a tuple set is viewed as a RVF.

In general, a composed RVF is defined by a SQL query from existing RVFs recursively. For example, given a RVFs f, g and table T, the query below SELECT a, b FROM f (SELECT c, d FROM g (T));

is viewed as a composed RVF defined with T's schema as the input schema.

Data-Continuous Execution of RVF: Streamed Executions

When an RVF is triggered by streamed input, event-conditions or timers once and once again, the sequence of executions generates a sequence of results. These results, typically distinguishable by timestamps, are referred to as the data-continuous execution, or streamed execution, of the RVF.

Data-Continuous Execution of RVF: Two Levels of Pipelining.

The streamed executions of cascaded RVFs are "inter-execution" pipelined, which, however, is different from "intra-execution" pipelining.

Two cascaded RVFs, $f_1$ and $f_2$, are intra-execution pipelined, meaning that the output of $f_1$ is iteratively returned chunk by chunk (a chunk is a tuple-set) when produced, and consumed by $f_2$ one-by-one without waiting for $f_1$ to complete.

We shift the pipelining approach from programming style to SQL style by connecting two pipelined RVFs with a relation schema based queuing structure with defined stream key attribute; an inserted element (tuple-set) by the producer RVF, identifiable by its stream-key value, would be de-queued by the consumer RVF. The same asynchronous communication mechanism applies to inter-execution pipelining.

For clarity, hereafter we refer to "inter-execution pipelined" and "intra-execution pipelined" as "streamed" and "pipelined" respectively.

Data-Continuous Execution of RVF: RVF Stations and Pipes.

In a data-continuous process, an RVF does not act as a one-time operation, but as a stationed operation driven by continuous inputs.

We introduce the notion of station to host an RVF for streamed execution. A station is also defined on a data-continuous SQL query which will be discussed later.

With streamed communication, connected RVFs are executed asynchronously. For this we introduce the notion of pipe as a FIFO stream container for connecting stations.

A pipe is defined by a relation schema for holding type-preserved steam elements and by a stream-key for identifying the stream elements.

A pipe is an abstract object that is implemented by a queue, a relation (in-memory or on disk), etc.

An RVF station is defined with the following properties. First, the hosted RVF is a composite one specified by a SQL query. Second, the triggering condition is specified as a SQL query and/or timer, which determines when and/or how often the hosted RVF runs. Third, the outgoing pipes are for holding the returned stream elements. Multiple pipes with replicated return elements are provided for linking to multiple stations, assuming that a queued data element can only be de-queued once.

Stations are also combined by a SQL query which is to be described later.

With these concepts, let us look at the input and output characteristics of streamed RVF execution.

Data-Continuous Execution of RVF: Continuous Execution

Figure 2:
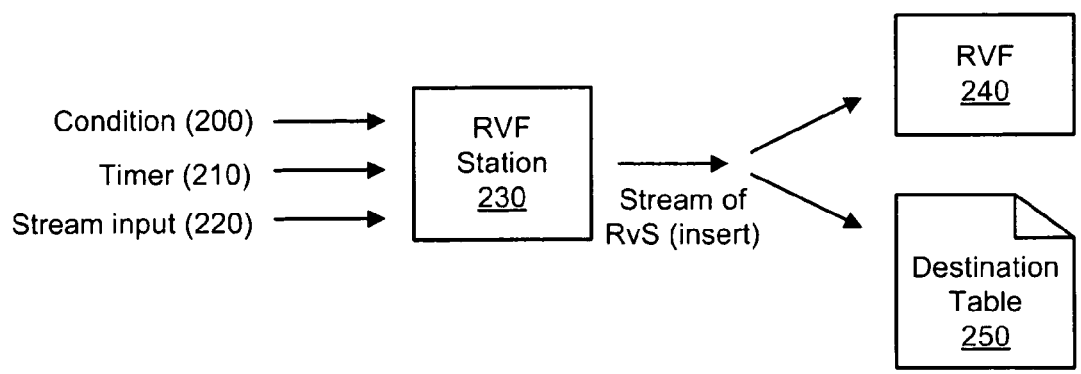
FIG. 2 shows a streamed RVF execution in accordance with an exemplary embodiment.

FIG. 2 shows a streamed RVF execution wherein a condition 200, timer 210, and stream input 220 are input into an RVF station 230. The output, stream of $R_v s$ (insert) is provided to RVF 240 and destination table 250.

The streamed RVF execution is triggered by the availability of streamed input 220 but controlled by the timer 210 or a condition 200. A condition (e.g. for checking with a threshold) is expressed by a query, and the non-empty query result means the satisfaction of the condition. The timer 210 is used to instruct when and how often to trigger an RVF, which controls the "pace" of the RVF executed in a process.

The trigger specifications are illustrated below, where r, q, t, d represents a table, a query, a time offset (e.g. 10 minutes after each hour) and a period (e.g. per hour) respectively.

START t WITH PERIOD d ON q

EXECUTE ON q

Conditions are defined either on tables or on pipes as a pipe also has a relation schema. The semantics is: when a condition is not satisfied, the input stream element to be processed currently will be ignored—i.e. skipped and removed from the pipe. In the following example, the stream table, traffic_table, is appended with the per-minute network traffic records and de-queued minute by minute; the condition is periodically checked to determine whether an RVF should be executed for signaling an alert.

SELECT host, SUM(to_connection) conn

FROM traffic_table

GROUP BY host HAVING sum(conn)>10000.

Intuitively, any host returned by the above query might be in the pin-to-die situation.

Data-Continuous Execution of RVF: Continuous Return and Cascade

Figure 3:
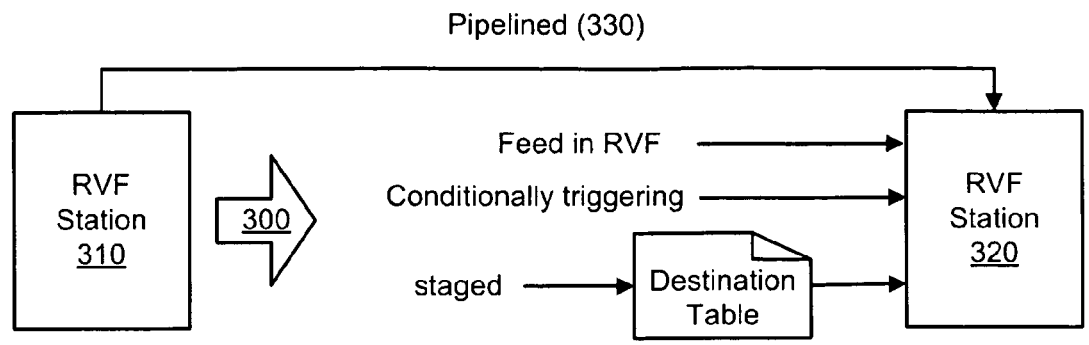
FIG. 3 shows streamed RVF executions resulting in a stream replicated to outgoing pipes in accordance with an exemplary embodiment.

FIG. 3 shows streamed RVF executions resulting in a stream replicated to outgoing pipes. As shown, a stream element 300, Rv (that can be a newly generated relation or an updated relation snapshot, up to the application logic) is fed from a first RVF station 310 to another RVF station 320 or deposited to a stream table (i.e. an append-only table with the sequence key consistent with the RVF's stream key). Rv can also serve as the base data for triggering condition evaluation. Further, executions of RVFs can be pipelined 330.

When an RVF station, F, is connecting to multiple stations, multiple outgoing pipes, say $p_1, \ldots, p_n$ with replicated stream elements are provided. A selected pipe $p_i$ is represented by the cast notation, as $(p_i)F$.

Data-Continuous Execution of RVF: RVF Function and Station Specifications

The capability of an RVF is specified functionally, and its streamed execution characteristics are specified on a station.

A function specification includes:

(1) the signature, i.e. the schemas of input relations and return relation;

(2) the data-continuation feature: streamed, pipelined, data-parallelizable, etc;

(3) the stream keys for identifying input and returned stream elements (tuple-sets);

(4) the procedure of the function.

A station specification includes:

(1) the hosted RVF which can be a composite one specified by a SQL query (as we will describe later, a station itself can also be a combined one);

(2) the conditions and timers for activating the hosted RVF, and (3) the actual outgoing pipes.

In addition, a station inherits the properties of the hosted RVF.

Figure 4:
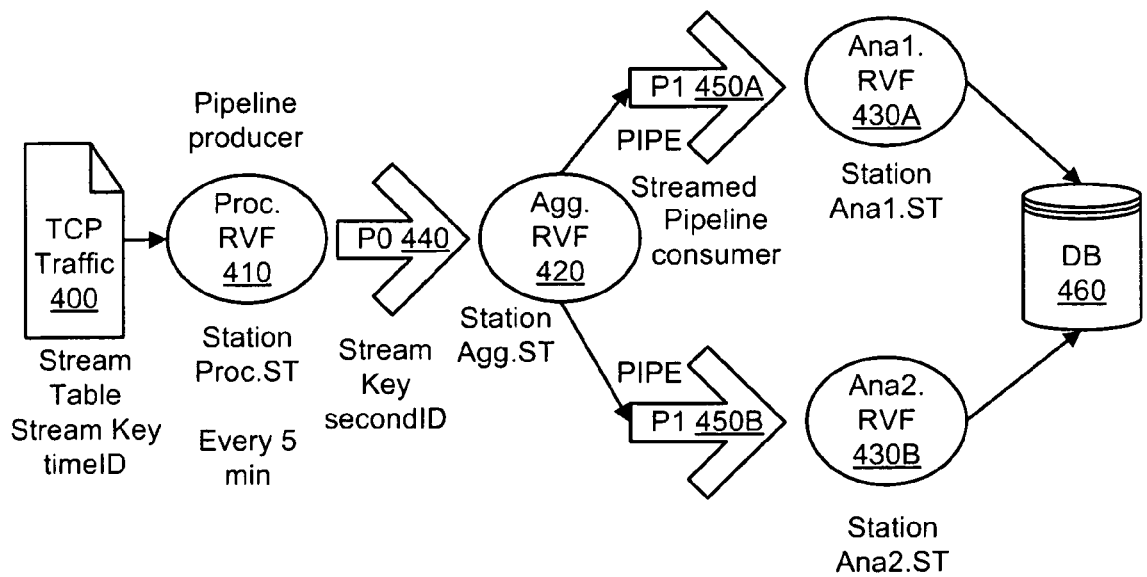
FIG. 4 shows a data-continuous RVF example in accordance with an exemplary embodiment.

FIG. 4 shows a data-continuous RVF example. Here, TCPT traffic 400 is provided to a pipeline producer 410 which outputs to a pipeline consumer 420. Streamed output goes to stations 430A and 430B.

As shown, the execution of Proc.RVF (in pipeline producer 410) and Agg.RVF (in pipeline consumer 420) are pipelined with interface pipe $P_0$ 440. Station Agg.ST (pipeline consumer 420) has two outgoing pipes $P_1$ (450A) and $P_2$ (450B) for connecting Ana1.ST (430A) and Ana2.ST (430B), respectively.

As shown in FIG. 4, Station Proc.ST is defined on RVF Proc.RVF and runs every 5 minutes to read network traffic records from stream table TCPTraffic (400) and process the tuples falling in the last 5 minutes time window on the per-tuple basis. The intermediate results grouped by secondID are en-queued to the pipe $P_0$ (440) for pipelined execution.

Station Agg.ST is defined on RVF Agg.RVF and incrementally aggregates the pipelined inputs form pipe $P_0$ (440). Each pipelined stream element contains multiple tuples with the same secondID. Pipelined with Proc.RVF, Agg.RVF also runs in the 5 minutes cycle and generates streamed return values which are replicated to pipes $P_1$ (450A) and $P_2$ (450B) with the stream key batchID.

The RVFs hosted in stations Ana1.ST (430A) and Ana2.ST (430B) read the streamed input from pipes $P_1$ and $P_2$ for further analysis. Their results are deposited to a database 460.

Table TCPTraffic (400) holds the tuples describing TCP traffic. The table is defined as an append-only STREAM table with a timestamp attribute as its STREAM KEY (not necessarily the primary key). At time t, the table contains all the tuples up to t.

CREATE STREAM TABLE TCPTraffic (/*schema R*/ . . . ) STREAM KEY timeID.

A pipe is defined by a relation schema and a STREAM KEY as follows:

CREATE PIPE P0 (/*relation schema Rp*/,/*physical type*/) STREAM KEY secondID;

CREATE PIPE P1 (/*relation schema Rv*/,/*physical type*/) STREAM KEY batchID;

CREATE PIPE P2 AS COPY OF P1.

The RVF function specification is defined as follows:

```
DEFINE RVF Proc.RVF (R) RETURN Rp {
    SCHEMA R (/*schema*/) STREAMED WITH KEY timeID;
    SCHEMA Rp (/*schema*/) PIPELINED WITH KEY secondID;
    PROCEDURE ( ... );
}
DEFINE RVF Agg.RVF (Rp) RETURN Rv {
    SCHEMA Rp (/*schema*/ .... ) PIPELINED WITH KEY secondID;
    SCHEMA Rv (/*schema*/ .... ) STREAMED WITH KEY batchID;
    PROCEDURE ( ... );
}
DEFINE RVF Ana1.RVF (R1) RETURN Ra {
    SCHEMA R1 (/*schema*/ .... ) STREAMED WITH KEY batchID;
    SCHEMA Ra (/*schema*/ .... )
    PROCEDURE ( ... );
}
...
```

Introducing stream-key makes a stream element, i.e. a set of tuples, identifiable but not necessarily share the same key value. In this example, the tuples falling in 5-minute windows are identifiable by their second-IDs.

Regardin the RVF station specification, the outgoing pipes and timers are specialized on stations. The streamed output of AggRVF is replicated to multiple pipes. No timers are specified on AggRVF and Ana1RVF, Ana2RVF since they are triggered by the availability of stream input with consistent stream key values.

```
DEFINE STATION Proc.ST ON Proc.RVF {
    RETURN TO P0
    START WITH PERIOD 5 MINUTE;
)
    DEFINE STATION Agg.ST ON Agg.RVF {
        RETURN TO P1, P2; /* replicate queues */
)
    DEFINE STATION Ana1.ST ON Ana1.RVF { };
....
```

Data Continuous SQL Process

A DCSP runs continuously with streamed input data and then streamed data-flows throughout the process. The components of a DCSP, stationed operations connected by FIFO pipes, are conceptually different from the "steps" and "links" found in the conventional business processes. The execution of a DCSP is open-ended without fixed starting and ending points. It runs continuously but may have different paces at different stations.

Exemplary embodiments construct a DCSP using SQL phrases for at least the following reasons: relying on the SQL expressive power in data derivation and filtering, and providing the interface for executing DCSP efficiently at the data management layer.

Data Continuous Query as Combined Station

The actors of a DCSP are RVFs and the relational operators provided in SQL. Since RVFs are stationed, they are not cascaded on the one-time execution basis but connected by data stream pipes. As mentioned before, queues and tables for holding streamed data are viewed as the specialization of pipes.

For example, when two RVFs $f_1$ and $f_2$ are executed at stations $F_1$ and $F_2$ with per minute and hourly cycles respectively, linking $f_1$ and $f_2$ no longer implies $f_2 \circ f_1$ with the meaning of $f_2 \circ f_1 : x = f_2 : (f_1 : x)$, but implies having their stations connected by a pipe and having the data stream from $F_1$ to $F_2$ staged in the pipe, where each execution of $f_2$ consumes 60 return elements from $f_1$.

Data-Continuation Semantics of SQL Query

We refer to a query applied to a stream data source as a Data Continuation Query (DCQ). A stream data source can be (1) a stream table, i.e. an append-only table holding streamed data with a defined stream key;

(2) an RVF station(connected via a pipe), and recursively (3) a DCQ (connected via a pipe).

For instance, given an RVF station F for holding RVF f with the outgoing pipe P, and a stream table T, the following query is a DCQ, where each execution of f reads from T a tuple-set identified by the defined stream key value, and returns a relation that is filtered by $\pi_{A,B}$ and A>0.

SELECT A,B FROM (P)F(T) WHERE A>0.

As another example, given RVF stations F, G for holding RVFs f, g and having outgoing pipes $P_f$ and $P_g$ respectively, the following query is also a DCQ.

SELECT A,B FROM ($P_f$)F(SELECT A,B,C FROM ($P_g$)G (T) WHERE A>0).

In this DCQ, each execution of f may not correspond to a single execution of g; the resulting relation of each execution of f in station F, is projected by $\pi_{A,B}$; the resulting relation of each execution of g in station G, is projected by $\pi_{A,B,C}$ and filtered by A>0.

In general, DCQ has the following data-continuation semantics.

(1) The semantics of combining two stations through a pipe p, $F_1$ ((p) $F_2$(S)), where S is a stream data source, is that $F_1$ takes (p) $F_2(S)$ as its stream data source, which is different from one-time execution based function composition.

(2) The semantics of applying a DCQ, Q on a stream data source S is that Q provides the relational transformation for each one stream element (a relation) of S.

Regarding DCQ as Station, a DCQ on data-continuous RVF stations and stream tables itself acts as a station, in a similar way as an RVF station, where execution conditions and outgoing pipes are specified as well. Introducing such "DCQ-stations" makes stations recursively constructible, and therefore allows a DCSP to be graph-structured. Further, it is noted that RVFs are composed in terms of regular SQL queries, and stations are combined in terms of DCQs.

DCSP Specified by Correlated DCQs

A DCQ represents asynchronously-coupled relational transformations. The side-effects of RVFs in database updates are performed inside the RVFs and are thus hidden from the DCQ.

As noted, a single SQL query has certain limitations in expressing graph-structured operations. For example, multiple outgoing pipes from a station are not expressible. To solve this problem, we use multiple correlated DCQs to represent a DCSP. The basic rule for expressing the execution order of multiple correlated DCQs, i.e. DCQ-stations is: a DCQ-station is referred to only after being defined.

By default, when a DCQ, Q, is just a wrapper of a station F, i.e. expressed as SELECT * from F (thus the results of Q and F are type-consistent), then the station defined on Q inherits the properties (e.g. outgoing pipes) of F. Any station has at least one default pipe if not specified, or multiple individually specified pipes when linked to multiple stations.

For example as shown in FIG. 4, the continuous data-flows form a DCSP. We assume the analysis results generated by Ana1.RVF and Ana2.RVF at each run are deposit to tables T1 and T2. A DCSP is represented by the following DCQs:

Define Station Q on
  SELECT * FROM Agg.ST ((P0)Proc.ST (TCPTraffic));
  INSERT INTO T1 (A, B)
    SELECT A, B FROM Ana1.ST (SELECT X, Y, U FROM (P1) Q);
  INSERT INTO T2 (C, D)
    SELECT C, D FROM Ana2.ST (SELECT X, Y, V FROM (P2) Q).

Based on the synergy of station and DCQ, a DCSP is actually constructed from stations and pipes recursively.

A DCSP EXAMPLE

Figure 5:
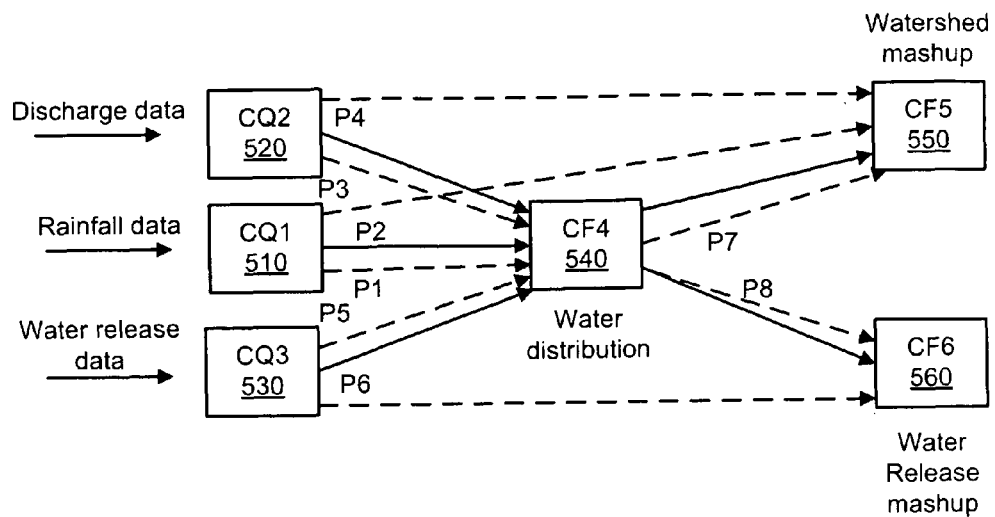
FIG. 5 shows a Data-Continuous SQL process for mashups in accordance with an exemplary embodiment.

Let us consider a hydrographic application oriented DCSP shown in FIG. 5 that provides continuously refreshed mashups for monitoring water drainage network and reservoir release respectively. The Data-Continuous SQL process includes a plurality of interconnected stations, shown as $CQ_1$ (510), $CQ_2$ (520), $CQ_3$ (530), $CF_4$ (540), $CF_5$ (550), and $CF_6$ (560). Here, solid lines are for control flows, and dash lines are for data flows.

The water drainage network is concerned with a natural water supply, and the reservoir release is concerned with water consumed by agricultural, industrial, household, etc. The water volume and water level distribution is computed based on rainfall, discharge, evaporation and the water release from reservoir.

A mashup dataset is stored in a table with fields for GML (Graphic Mark Language) expressing "feature objects", layout information, the Uniform Resource Locators (URLs) to external Web pages such as National Aeronautics and Space Administration (NASA's) satellite images, that are retrieved by a mashup engine for generating a presentation level display. The continuous data-flows, as well as control flows, are shown in FIG. 5.

A river_segments table holds the static river segment data; the stream tables involved in this hydrographic mashup example include (1) rainfall_data table holding incoming water to river segments, (2) discharge_data table holding outgoing water from river segments, and (3) water_release_data table holding water release and other water management data.

There are three RVFs involved: water_distribution, watershed_mashup and water_release mashup; they sit in stations $CF_4$ (540), $CF_5$ (550), and $CF_6$ (560), respectively. All the stations are specified by SQL queries where stations $CQ_1$ (510), $CQ_2$ (520), and $CQ_3$ (530) are specified by queries on stream tables, and $CF_4$ (540), $CF_5$ (550), and $CF_6$ (560) are specified by queries on RVFs.

The DCSP process is specified below where definitions on tables, pipes and RVFs are made global.

```
CREATE DCSP co_mashup {
  DEFINE STATION CQ₁ ON
    SELECT river_seg, date_hour, SUM(rainfall)
    FROM rainfall_data GROUP BY river_seg, date_hour {
    RETURN TO P1, P2;
    START WITH PERIOD 1 HOUR;
  }
  DEFINE STATION CQ₂ ON
    SELECT a.river_seg, b.date, b.discharge_rate
    FROM river_segments a, discharge_data b
    WHERE a.region = b.region {
    RETURN TO P3, P4;
    START WITH PERIOD 1 HOUR;
  }
  DEFINE STATION CQ₃ ON
    SELECT river_seg, water_release_volume
    FROM water_release_data {
    RETURN TO P5, P6;
    START WITH PERIOD 1 HOUR;
  }
  DEFINE STATION CF₄ ON
    SELECT * FROM Water_distribution ((P1)CQ₁, (P3)CQ₂,
      (P5)CQ₃) {
    RETURN TO P7, P8;
  }
  DEFINE STATION CF₅ ON
    SELECT * FROM Watershed_mashup ((P2)CQ₁, (P4)CQ₂,
      (P7)CF₄);
  DEFINE STATION CF₆ ON
    SELECT * FROM Water_release_mashup ((P6)CQ₃, (P8)CF₄);
  INSERT INTO mashup_table1 SELECT * FROM CF₅;
  INSERT INTO mashup_table2 SELECT * FROM CF₆;
}
```

This example illustrates how a DCSP is constructed from RVF stations and DCQ stations in terms of correlate DCQs.

EXEMPLARY IMPLEMENTATIONS

The DCSP system with exemplary embodiments can be integrated into an extended parallel database engine, where the traditional one-time query and UDF executions are replaced by the data-continuous RVF executions.

By way of example, a pipe is implemented as a queue table that is transaction protected. The pipes are type-preserved by relation schemas. RVFs are compiled, meaning that all the queries involved in the RVFs bodies are "prepared" by the query optimizer.

A DCQ involving RVFs, is treated in the following way:
(1) the pipes from RVFs are treated as data sources of the query;
(2) a query plan for the query on those data sources is pre-prepared; and
(3) the query gets input from input queues (for example, a default queue prepared by the system) and return to the outgoing queues.

When a DCSP starts, all its stations are registered to the system. A Station Status Descriptor (SSD) is provided for a station (for example, buffered in memory) for tracing its execution status (e.g. timestamps of the processed stream elements). Certain system utilities for handling timeout, redo, etc, are invoked based the execution status.

The executions of the stationed RVFs are scheduled by a central scheduler in the poll mode. During execution, a station gets input data from its input queues, updates the SSD, and writes results to its outgoing queues. Timers are handled by the scheduler.

Exemplary embodiments provide transactional semantics on RVFs and queues in the relational context. Queues are implemented as tables and are protected under transaction semantics. In one embodiment, the outmost boundary of a single transaction is within a single execution of a RVF, and the database is not required to support nested transactions. Further, a DCSP includes both transactional and non-transaction RVFs. In a failure recovery, the former is undone and the latter is compensated Data-Parallel RVF Execution Patterns Executing DCSPs on a parallel database allows exemplary embodiments to utilize parallel processing capability in data access and RVF execution. In a parallel database system, a table is partitioned into multiple system nodes. Each partition is accessed by a local engine so the data of the table is retrieved in parallel. The user does not need to explicitly indicate how to parallelize data retrieval, and the underlying parallel processing is completely transparent to the user. Both stream tables and pipe tables (queues) are partitioned. For supporting, data partition based parallel execution of an RVF, we allow user-defined partitioning under which a relation is partitioned based on the computation model.

Figure 6:
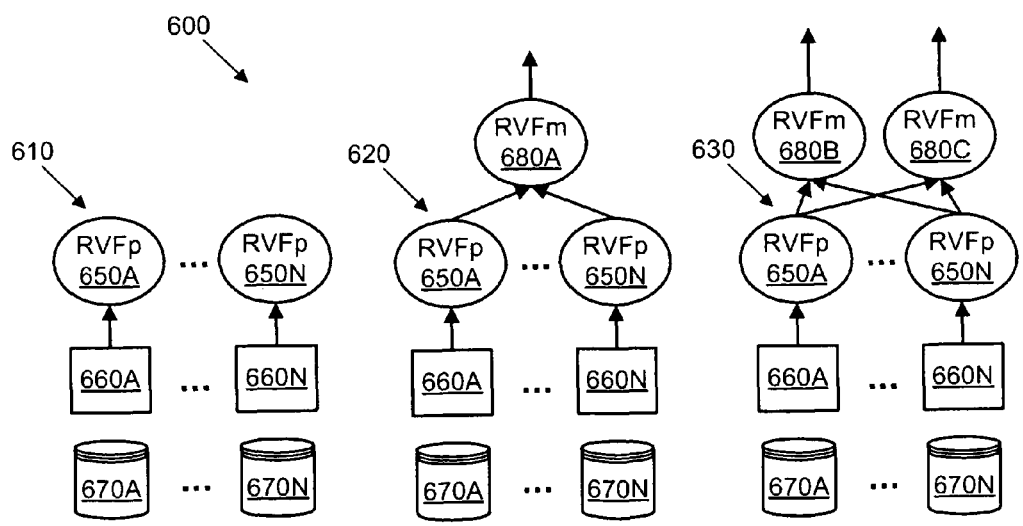
FIG. 6 shows a system with parallelized RVF execution with a tuple-parallel scheme, tuple-parallel-merge scheme, and a tuple-parallel-group-merge scheme in accordance with an exemplary embodiment.

FIG. 6 shows a system 600 with parallelized RVF execution with a tuple-parallel scheme 610, tuple-parallel-merge scheme 620, and a tuple-parallel-group-merge scheme 630. The schemes each include a plurality of RVFs (shown as $RFV_p$ 650A-650N), data partitions (shown as 660A-660N), and parallel database nodes (shown as 670A-670N). An $RVF_m$ 680A connects to the plural RVFs in scheme 620, and two $RVF_m$ 680B and 680C connect to the plural RVFs in scheme 630.

Since an RVF is data-driven, it fits in the "data-parallel" execution model. Copies of an UDF are made available to all system nodes; each being driven by the presence of local partition of the input data. In this design, pipes are implemented as tables which are parallelized. This opens the potential for parallelizing the execution of certain RVFs such as those for per-tuple processing (e.g. converting each IP address to a domain name) and those for some kind aggregations, where parallelized executions have no dependency on each other. Our approach to parallelizing the execution of an RVF is to provide patterns interpretable by the query optimizer. Let us consider the following simple parallel RVF execution patterns (note that the context here is how to parallelize one-time execution of a, possibly composite, RVF, not a station).

First, for data-parallel of scheme 620, $RVF_p$ is specified as DATA-PARALLELIZABLE. Its instances are executed at all nodes (670A-670D) in parallel, with the results individually included in the returned relation (can be partitioned).

Second, for data-parallel-merging in scheme 630, the results of multiple $RVF_p$ executions are merged by $RVF_m$.

Third, for data-parallel-group-merging in scheme 640, the results of multiple $RVF_p$ executions are grouped by an attribute and then merged in groups by the multiple instances of $RVF_m$ in parallel.

For the query optimizer to determine parallel execution, a hint including the following information is provided:
(1) the DATA-PARALLELIZABLE of a RVF, and
(2) the parallel execution patterns with parameters, such as group by what.

Therefore, for parallelization purpose, we can specify an RVF as DATA-PARALLELIZABLE, and wrap an application by a pair of RVFs, such as the $RVF_p$ and $RVF_m$ above, to fit in these data-parallel execution patterns. More data-parallel patterns are under investigation.

One exemplary difference between DSCP and business process management (BPM) is that BPM addresses the orchestration of operations on the per-process instance basis, but DSCP represents the streamed data flow through stationed functions in an open-ended process execution. Therefore, the concepts of stations, pipes used in DSCP and the steps, links found in BPM, are not directly comparable. Another difference is that the stationed operations in DSCP are assembled using SQL queries under the specific data-continuation semantics.

With exemplary embodiments, the notion of pipes has unique features. Pipes are used to asynchronously connect any stream data sources including RVFs, queries and fact tables. Furthermore, pipes are used to unify a queue with a table and used with queuing/de-queuing with SQL operations (a pipe is strongly typed with a relation schema and a stream key).

Exemplary embodiments automate enterprise information derivation by using the Data-Continuous SQL Process model which is a new kind of business process model specified in SQL for underlying data-driven, data-intensive, and continuously running applications. This model provides a synergy of stream processing, pipelined operation and continuous querying, as well as the synthesis of relational operation, UDF and business process. Further, the model formalizes the notion of data-continuous process in terms of the concepts of station and pipe. Furthermore, the model uses data continuous SQL query (DCQ) to be the constructor of DCSP under the well defined data continuation semantics.

Exemplary embodiments enable an extension to a parallel database engine to support DCSP where the traditional one-time query and UDF executions are replaced by the data-continuous RVF executions. The DCSP engine can be plugged directly to a parallel DBMS for parallelized data access, queuing, and RVF execution. Exemplary embodiments thus provide a major shift in process management from supporting one-time-execution to supporting data stream driven, open-ended execution that brings BPM technology and database technology together under the data-continuation semantics.

Figure 7:
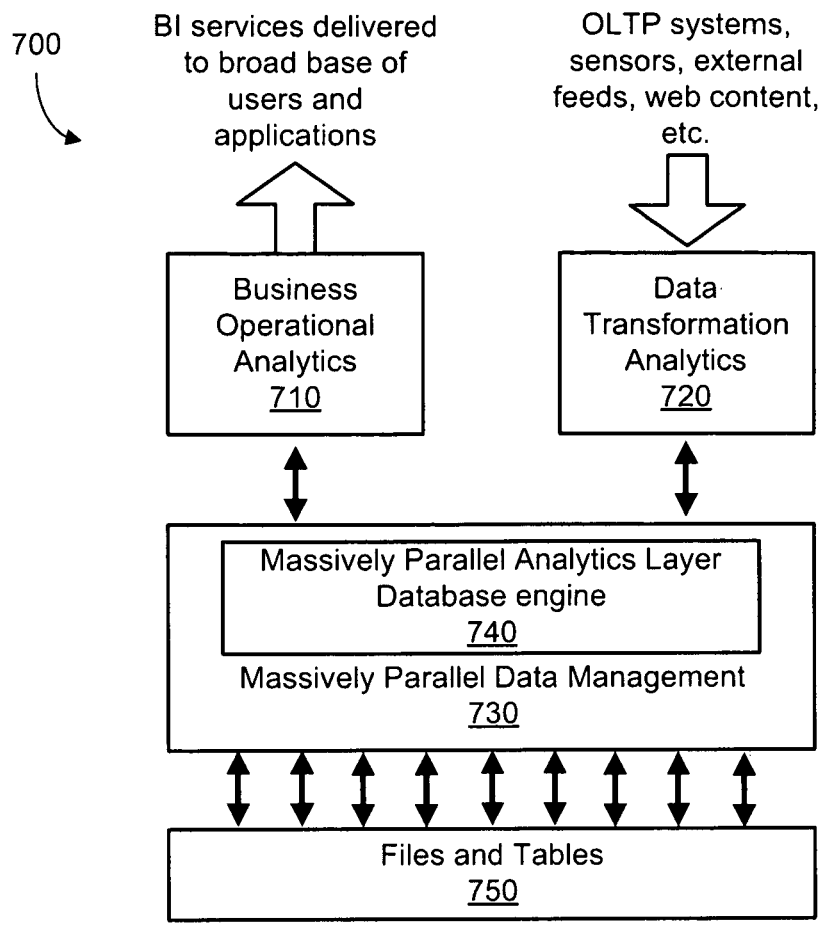
FIG. 7 is a system in accordance with an exemplary embodiment.

FIG. 7 is a system 700 in accordance with an exemplary embodiment. The system includes business operational analytics 710, data transformation analytics 720, massively parallel data management or data warehouse 730 (with a massively parallel analytics layer having a database engine 740) coupled to files and tables 750.

Information is extracted or obtained from a source, such as OLTP systems, a stream of data, sensors, external feeds, web content, etc. This information is provided to the data transformation analytics 720 that performs data transformation, information extraction, and summarization. The information is provided to the data warehouse 730 which includes a database engine or massively parallel analytics layer 740. Query processing is performed inside the data warehouse with the database engine. As such, the application is at the data source (i.e., in the data warehouse).

Incoming queries are split or divided into multiple queries. Results of queries are used as a data source for a subsequent query. Thus, instead of putting query results in a queue, exemplary embodiments provide the query results as the next query.

Furthermore, as network traffic continuously enters the system, the incoming data is processed in batches as opposed to waiting for all records to be received. The data is processed in batches within a specified time periods (for example, processed every second, every minute, every five minutes, every hour, etc.).

Middleware Inside Database Engine

A query plan (QP) is made of the queries and RVFs executable by the query engine with extended support to RVFs. In order to handle long-running QPs, as well as multiple QPs with interleaved operations, a light-weight and pluggable QP Management System (QPMS), as a "middleware inside query engine", is used.

A QPMS handles data-flows in the way distinguishable from most DSMSs since the steam elements are relations, not limited to single tuples. The operations compose to a process rather than stand-alone, and they are queries or queries invoking RVFs. A QPMS is process-instance aware; an operation is treated, and identifiable, as a component of the containing QP instance.

One exemplary embodiment uses a built-in QPMS that has two major components:
(1) QPM—i.e. QP Process Manager for creating and managing QP instances, and for scheduling operations;
(2) OLM—i.e. Operation List Handler for launching queries (possibly involving RVFs).

Deduce Control-Flows from Data-flows

In a QP, a control-flow path implies a data-flow path but not vice versa. For example, the data flow path from Q to $Q_1$ and $Q_2$ are additional to the control-flows. However, given the data dependencies between operations as indicated by the "data sources" of the correlated SQL queries, the control-flows between them are derivable based on the following semantics:
(1) the data-flows form a DAG, meaning that no cyclic links;
(2) An operation having multiple predecessor operations is eligible for execution when all its predecessors have produced output (conjunction).

Figure 8:
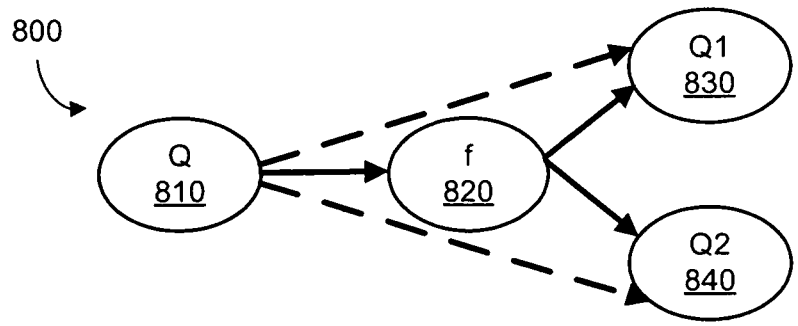
FIG. 8 is a query process with separate data-flows and control flows in accordance with an exemplary embodiment.

FIG. 8 is a query process 800 with separate data-flows and control flows in accordance with an exemplary embodiment. In this process, an application is modeled by a query Q 810, RVF f 820 that takes the query's results as input, and query Q1 830 and query Q2 840 which takes input from both f 820 and Q 810. Here, the data flows and control flows are not coincident.

$Q_1$ (830) and $Q_2$ (840) are triggered only after f is completed. The control flows as data dependencies are expressed by a nested sequence <Q, f, [$Q_1$, $Q_2$]> (not necessarily unique) meaning that Q should be executed before f; and [$Q_1$, $Q_2$] are executed in any order but after f. A control-sequence deduced from data-dependencies ensures the involved query Q and RVF f to be executed only once.

Support QP Execution

The executions of QPs are controlled by the QPM and OLM services. The component queries, data-flows and control-flows derived from data-dependencies, represent the static properties of a QP which constitute the template for its execution. The general steps of executing a QP, as well as the functionalities of QPM and OLM wherein, can be outlined as below.

First, based on the definition of a QP, the QPM creates a QP instance and derives one control-sequence of its operations. A QP instance has several states (ready, in-progress, complete/fail) maintained by the QPM. A QP instance object is persisted after each use unless the process is specified as TRANSIENT, so are the operation instances and pipes.

Second, the QPM creates the start operation instances based on the control-sequence. An operation instance also has states (ready, in-progress, complete/fail).

Third, for running every operation including the start ones, the QPM identifies the incoming pipes, creates the outgoing pipes and generates an operation-item from the corresponding operation instances, and puts it to the operation queue. At the minimum, an operation item includes the process-instance-ID, the-operation-instance-ID, the query, and the references to incoming and outgoing pipes. The operation items in the operation queue are executed in any order, and in fact they are de-queued in pipeline and executed by individual, time-overlapping threads.

Fourth, the OLM runs as a separate thread of the QPM, it de-queues the operation items one by one; for each item (i.e. a query), it launches a thread to execute the query using a high-efficient Postgres internal SPI facility, then puts the query result into the outgoing pipes, and sends a return message to the QPM. The return massage, rv, contains, at the minimum, the process-instance-ID, the-operation-instance-ID, the query execution status returned from the Postgres query engine, and the references to outgoing pipes.

Fifth, upon receipt of the rv, the QPM updates the corresponding operation instance and process instance, checks the control-sequence and triggering condition or timer, then selects the next eligible operation or operations to run, rolling forward the process, towards the end of it.

The above mechanism is used to deal with one-time execution of a QP. When a data continuous query process (DCQP) as a whole is only triggered by the presence of input stream elements, its continuous execution is in fact a sequence of one-time executions.

Support DCQP Execution

A DCQP is triggered by a stream of events—i.e. data elements, by timers or other conditions. To support DCQP executions, two cases are distinguished.

First, the DCQP is triggered to run as a whole, and there are no other triggers, such as timers, applied to its component operations. In this case, the continuous execution of the DCQP is made of a sequence of one-time executions.

Second, the component operations of a DCQP have varying pace caused by certain timers applied to them. For example, a set of traffic records are aggregated hourly but analyzed daily.

One exemplary embodiment supports an OPEN DCQP that is also based on the poll-mode for scheduling. However, the operations are not stand-alone but process-aware. An OPEN DCQP instance is "always running"; the statuses of it and its component operations are traced by the QPM. At process run-time, the QPM polls the operations, checks the availability of input data and interacts with the timers, then picks the ready-to-run operations and sends them to the operation queue. The execution of an operation (query or query invoking RVFs) is handled by the OLM, and process level control allows handling the inter-relationship of the operations. For instance, if an hourly network traffic aggregation is failed (by exception, timeout, etc.), it can be re-run at the next hour, depending on the policies specified at the process level.

Figure 9:
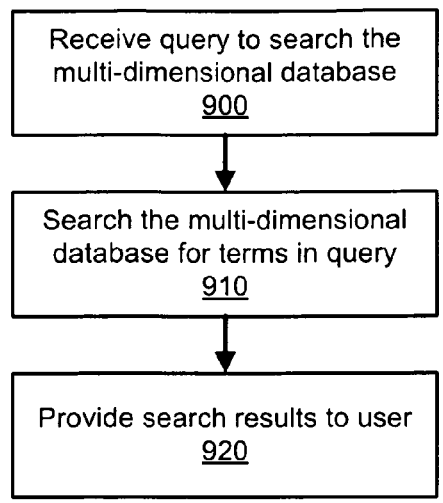
FIG. 9 is a block diagram of a method for searching a database in accordance with an exemplary embodiment.

FIG. 9 is a flow diagram for traversing a multidimensional database while searching a query in accordance with an exemplary embodiment. By way of example, the flow diagram is implemented in a data center that receives stores data in a database, receives queries from a user, and executes the queries, provides search or query results back to the user.

According to block 900, a query is received to search a multi-dimensional database.

According to block 910, the database is searched for the terms or keywords in the query.

According to block 920, results of the query are provided to the user. For example, the results of the query are displayed to the user on a display, stored in a computer, or provided to another software application.

Figure 10:
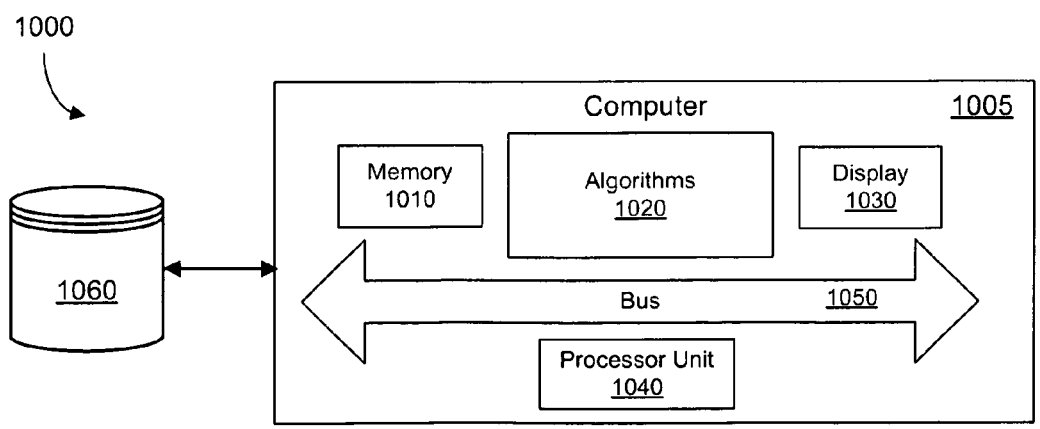
FIG. 10 is a block diagram of a computer for executing methods in accordance with an exemplary embodiment.

FIG. 10 is a block diagram of a computer system 1000 in accordance with an exemplary embodiment of the present invention. By way of example, the computer system is implemented in a data center.

In one embodiment, the computer system includes a database or warehouse 1060 (such as a multidimensional database) and a computer or electronic device 1005 that includes memory 1010, algorithms 1020, display 1030, processing unit 1040, and one or more buses 1050.

In one embodiment, the processor unit includes a processor (such as a central processing unit, CPU, microprocessor, application-specific integrated circuit (ASIC), etc.) for controlling the overall operation of memory 1010 (such as random access memory (RAM) for temporary data storage, read only memory (ROM) for permanent data storage, and firmware). The processing unit 1040 communicates with memory 1010 and algorithms 1020 via one or more buses 1050 and performs operations and tasks necessary for constructing models and searching the database per a query. The memory 1010, for example, stores applications, data, programs, algorithms (including software to implement or assist in implementing embodiments in accordance with the present invention) and other data.

DEFINITIONS

As used herein and in the claims, the following words are defined as follows:

The term "continuous query" is a registered query that is repeatedly triggered.

The term "database" means records or data stored in a computer system such that a computer program or person using a query language can send and/or retrieve records and data from the database. Users pose queries to the database, and records retrieved in the answer to queries contain information that is used to make decisions.

The term "Data Continuous Query" or "(DCQ)" is a query applied to a stream data source.

The term "database management system" or "DBMS" is computer software designed to manage databases.

The term "extract, transform, load" or "(ETL)" in a database or data warehouse extracting data from a source, transforming the data for operational requirements, and loading the data into the database or data warehouse.

The term "multidimensional database" is a database wherein data is accessed or stored with more than one attribute (a composite key). Data instances are represented with a vector of values, and a collection of vectors (for example, data tuples) are a set of points in a multidimensional vector space.

The term "pipeline" is a co-execution of a data producer operation and a data consumer operation.

The term "OLAP" and "online analytical processing" is business intelligence that uses relational reporting and data mining in a multi-dimensional model to answer queries to stored data.

The term "Structured Query Language" or "SQL" is a database computer language that retrieves and manages data in a relational database management systems (RDBMS), database schema creation and modification, and database object access control management. SQL provides a language for an administrator or computer to query and modifying data stored in a database.

The term "stream" is a time varying data sequence.

The term "User Defined Functions" or "UDF" is a function in a program that provides a mechanism for extending the functionality of a database server by adding a function that can be evaluated in SQL statements.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
repeatedly triggering a User Defined Function (UDF) that generates a data stream;
applying, with a computer, a data continuous Structured Query Language (SQL) query to the data stream to construct a data continuous SQL process (DCSP);
modeling the DCSP as a graph of stations specified with triggering conditions and outgoing pipes, the outgoing pipes defined with a relation schema for type-preservation and with a stream key for identifying stream elements, wherein relations returned from the UDF are replicated to multiple pipes for multiple destination stations; and
executing, in a database engine located in a database, the DCSP, wherein the UDF includes relational operators in the SQL query and expresses a relational transformation since the UDF includes an input value as a relation and an output value as a relation.

2. The method of claim 1, wherein the UDF is repeatedly triggered by stream inputs, timers, and event conditions.

3. The method of claim 1 further comprising:
specifying data-stream-driven processes with SQL queries;
executing the data-stream-driven processes directly at a database management system (DBMS) level.

4. The method of claim 1 further comprising, executing UDFs under streamed Input/Outputs.

5. The method of claim 1, wherein the DCSP is data-stream driven and continuously running.

6. The method of claim 1 further comprising, constructing the DSCP from stations and pipes recursively as a Data Continuous Query (DCQ).

7. The method of claim 6 further comprising, using multiple correlated DCQs to represent the DSCP, wherein data flows are naturally expressed by DCQs and execution ordering is based on a DCQ station defined before being referred to in other DCQs.

8. The method of claim 1 wherein the UDFs have as input a list of relations and return value as a relation called Relation Valued Functions (RVFs).

9. The method of claim 1 wherein a producer RVF inserts an element identifiable by a stream key value, and a consumer RVF de-queues the inserted element.

10. A non-transitory computer readable storage medium having instructions for causing a computer to execute a method, comprising:
executing a continuous data stream process with three functions that include an extract, transform, load (ETL) process, an aggregation process, and reporting process;
specifying the continuous data stream process with Structured Query Language (SQL) queries;
executing the SQL queries at a database management system (DBMS) level, wherein the SQL queries include User Defined Functions (UDFs) that perform relational transformations like a relational operator since the UDFs include input values as relations and output values as relations; and
identifying stations with triggering conditions and outgoing pipes, the outgoing pipes defined with a relation schema for type-preservation and with a stream key for identifying stream elements, wherein relations returned from the UDF are replicated to multiple pipes for multiple destination stations.

11. The non-transitory computer readable storage medium of claim 10, wherein the ETL process, the aggregation process, and the reporting process execute in different cycles with the ETL process executing more frequently than the reporting process.

12. The non-transitory computer readable storage medium of claim 10 further comprising, pushing down the continuous data stream process to the DBMS level to avoid round-trip traffic in data access and utilize parallel database communications to increase performance of executing the SQL queries.

13. The non-transitory computer readable storage medium of claim 10, wherein the ETL process, the aggregation process, and the reporting process are not cascaded on a performance execution basis since for every given number of plural executions of the ETL process the aggregate process executes only once.

14. A computer system, comprising:
a computer that generates a data continuous Structured Query Language (SQL) query to a continuous data stream to construct a data continuous SQL process (DCSP);
a database in communication with the computer, the database including a database engine that executes the DCSP in the database, wherein the DCSP is constructed from User Defined Functions (UDFs) that include relational operators in the SQL query and that express a relational transformation since the UDFs include an input value as a relation and an output value as a relation; and
wherein the DCSP includes stations specified with triggering conditions and outgoing pipes, the outgoing pipes defined with a relation schema for type-preservation and with a stream key for identifying stream elements, wherein relations returned from the UDF are replicated to multiple pipes for multiple destination stations.

15. The computer system of claim 14, wherein the UDFs are continuously running.

16. The computer system of claim 14, wherein execution of the DCSP occurs in the database to increase performance of executing queries to the database.

17. The computer system of claim 14, wherein the UDFs are triggered to repeatedly run by stream inputs to generate a data stream that is deposited to a stream table.

18. The computer system of claim 14, wherein the UDFs are triggered to repeatedly run by stream inputs to generate a data stream that is fed into other UDFs.

19. The computer system of claim 14, wherein the UDFs are triggered to repeatedly run by stream inputs and are not composed on a one-execution basis but coupled asynchronously together.

20. The computer system of claim 14 further comprising:
stations that host the UDFs that are continuously executed;
pipes that function as first-in-first-out containers that connect the stations.

* * * * *

UNITED STATES PATENT AND TRADEMARK OFFICE
CERTIFICATE OF CORRECTION

PATENT NO. : 8,725,707 B2
APPLICATION NO. : 12/411670
DATED : May 13, 2014
INVENTOR(S) : Qiming Chen et al.

It is certified that error appears in the above-identified patent and that said Letters Patent is hereby corrected as shown below:

In the Claims:

In column 17, line 35, in Claim 6, delete "DSCP" and insert -- DCSP --, therefor.

In column 17, line 38, in Claim 7, delete "DSCP," and insert -- DCSP, --, therefor.

Signed and Sealed this
Twelfth Day of August, 2014

Michelle K. Lee
*Deputy Director of the United States Patent and Trademark Office*